United States Patent Office 3,544,842
Patented Dec. 1, 1970

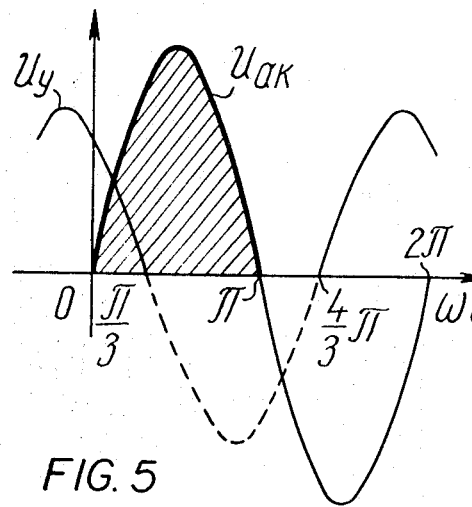
FIG. 5
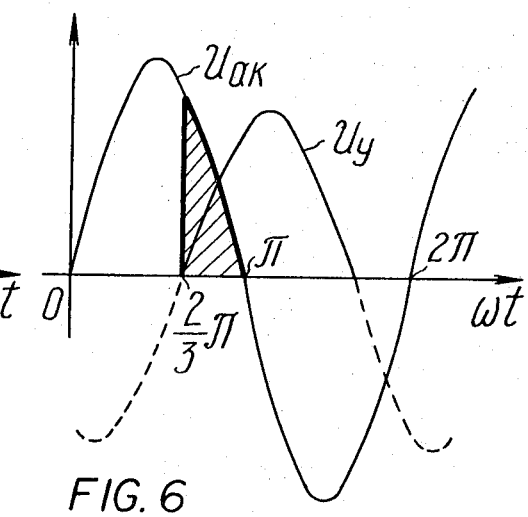
FIG. 6
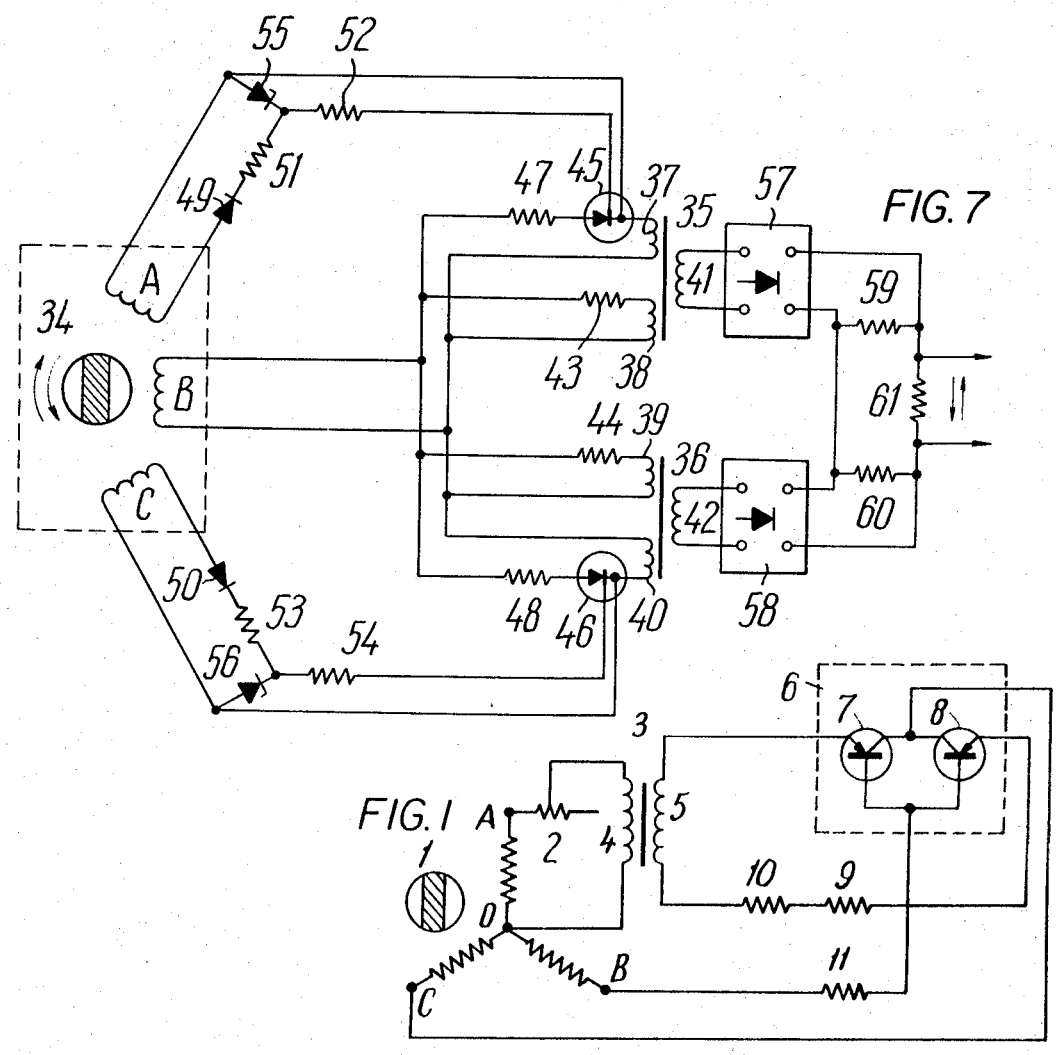
FIG. 7
FIG. 1

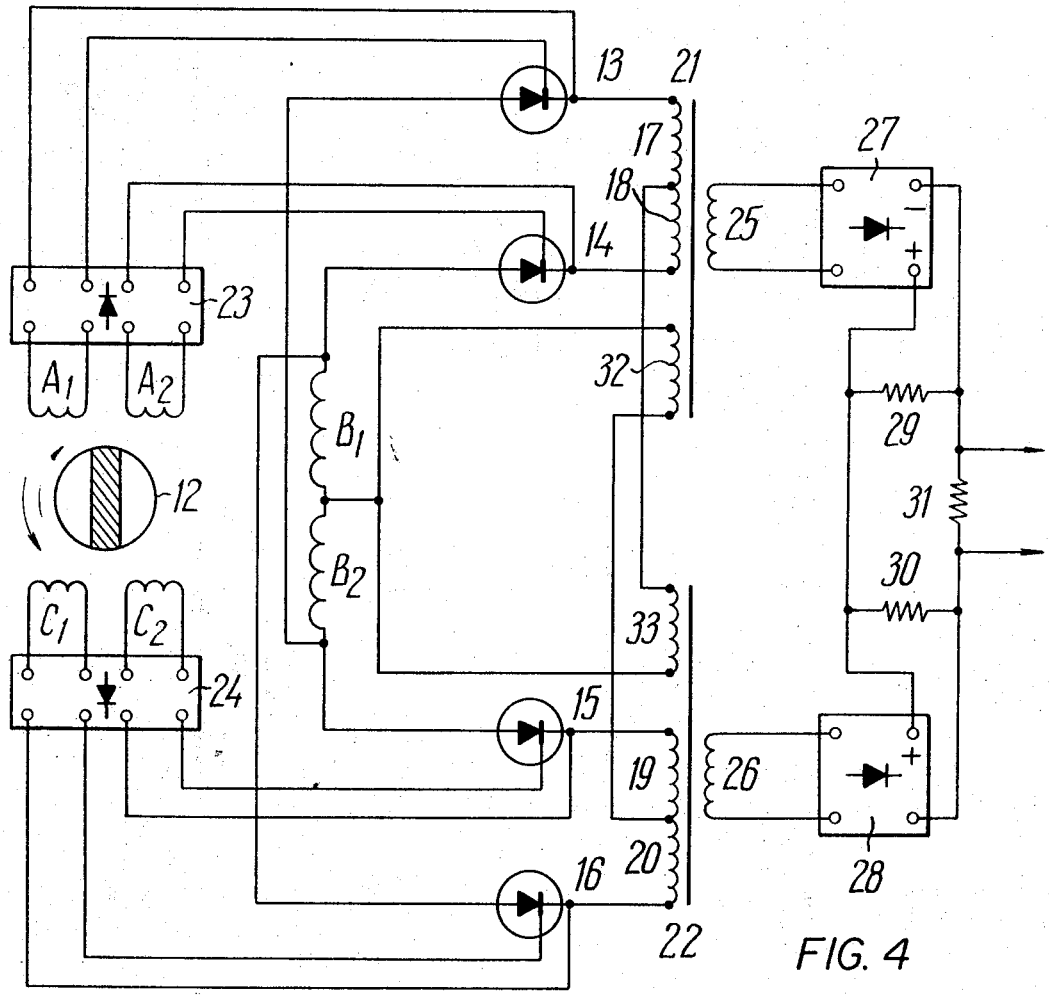
FIG. 4
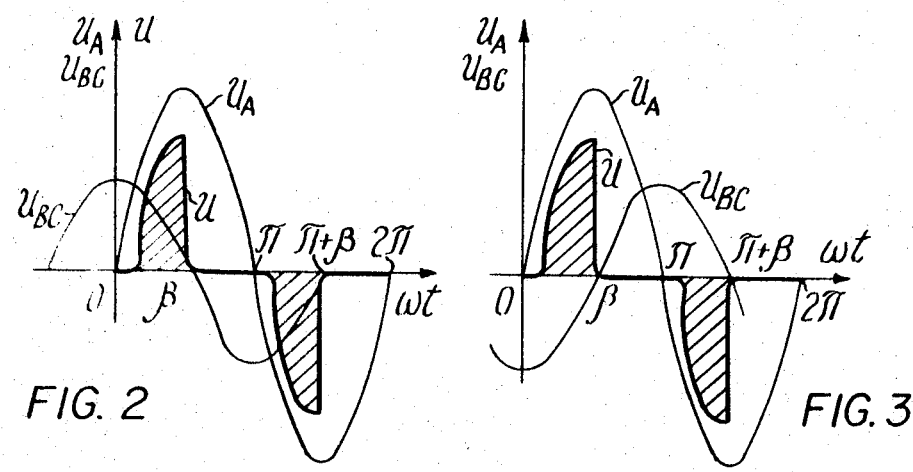
FIG. 2
FIG. 3

3,544,842
DEVICE FOR DETERMINING THE VALUE AND DIRECTION OF THE ANGULAR SPEED FOR ROTATION OF MACHINE PARTS
Zhozef Alexandrovich Yampolsky, Institutskaya ul. 52, kv. 7, Lvov, U.S.S.R.
Filed Oct. 31, 1967, Ser. No. 679,337
Int. Cl. G01p 3/44
U.S. Cl. 317—5                  8 Claims

ABSTRACT OF THE DISCLOSURE

A tachometric device in which a polyphase generator is connected to a phase sensitive unit to which is connected a saturable core transformer.

---

This invention relates to tachometric devices for measuring the value and direction of the angular speed of rotation of machine parts.

Devices are known for determining the value and direction of angular speed, which contain an A.C. multiphase tachogenerator, a phase-sensitive unit and a D.C. output load, for example, a pointer-type indicator (see Koppitz Frank "Drehzahlmessung mit gleichzeitiger Anzeige der Drehrichtung, Arch. techn. Messen, 1964, No. 341, 121–122; French Pat. No. 1,201,715, G0Ip).

In such devices the absolute output value depends not only on the angular speed (speed of rotation of the tachogenerator rotor), but also on the mean value of the tachogenerator E.M.F.

Thus any variation in the tachogenerator E.M.F. (steepness of its frequency characteristic) produced by demagnetization of the rotor, temperature or replacement of one tachogenerator by another, produces additional errors in the device.

An object of the invention is to provide a frequency dependent device which would allow the value of the output signal to depend only on the angular speed (frequency) of rotation of the monitored part thus making for increased accuracy of the device and a reduction of additional errors due to variation in tachogenerator E.M.F.

This and other objects are achieved by a device, comprising an A.C. $m$ phase tachogenerator, a phase-sensitive unit and a D.C. output load, in which, in accordance with the present invention, to the phase-sensitive unit controlling the signals of at least one tachogenerator phase there is connected at least one saturation or saturable core transformer in such a way that at the output of the device there appears a signal, the value and polarity of which depend on the angular speed of rotation and its direction, respectively.

For the polarity of the signal at the output of the device to change depending on the direction of rotation, it is advisable to connect a phase-sensitive unit to the output of a saturating transformer and to make it in the form of a phase-sensitive rectifier of the secondary-winding voltage of the saturation transformer.

For the polarity of the signal at the output of the device to change depending on the direction of rotation, it is possible for the phase-sensitive unit to employ at least two controlled diodes, connected to the input of two saturation transformers in such a way that the working electrodes of the controlled diodes are connected to the primary windings of the saturation transformers and the controlled electrodes to at least one tachogenerator phase. The secondary windings of the saturation transformers can be connected to the output load via differential rectifiers.

In accordance with the present invention it is possible to provide each of the saturation transformers with field windings connected to the controlled diodes in such a way that each of the saturation transformers is magnetized by the operating current of the primary circuit of the other saturation transformer.

In addiion, it is possible to provide the saturation transformers with field windings connected to the tachogenerator windings via controlled diodes, and to connect the primary windings of the saturation transformers directly to the tachogenerator windings and in antiphase to the field windings of the saturation transformers.

The present invention will further be described by way of example with reference to the accompanying drawings, wherein:

FIG. 1 shows the device of the present invention in which a phase-sensitive unit is made in the shape of a phase-sensitive rectifier connected to the output of a saturation transformer;

FIGS. 2 and 3 show voltage-against-time graphs, explaining the operation of the device shown in FIG. 1;

FIG. 4 shows a design version of the device in which the phase-sensitive unit employs controlled diodes;

FIGS. 5 and 6 show voltage-against-time graphs, explaining the operation of the device shown in FIG. 4; and FIG. 7 shows a design version of the device in which connected to a three-phase current generator are three-winding saturation transformers.

The device shown in FIG. 1 for determining the value and direction of angular speed of rotation comprises a three-phase tachogenerator 1 to phase A of which, via a ballast resistor 2 there is connected a saturation transformer 3 with a primary winding 4 and a secondary winding 5. To secondary winding 5, via a phase-sensitive rectifier 6 consisting of transistors 7, 8 there are connected a ballast resistor 9 and a load 10. Line voltage $U_{BC}$ of phases B and C is applied to a ballast resistor 11 and the control terminals of phase-sensitive rectifier 6.

Ballast resistors 2 and 11 can be ohmic, capacitive, inductive or may be omitted altogether. Phase-sensitive rectifier 6 can be of the half-wave or full-wave type and employ transistors, diodes or controlled diodes.

The rotor of tachometer 1 is rotated by the shaft being monitored. In the phases ABC of the tachogenerator stator an E.M.F. is induced, the frequency of which is proportional to the angular speed of the tachogenerator rotor, while the sequence of the phases depends on the direction of its rotation. Actually, with the rotor rotating in one direction the phase voltage $U_A$ leads by $\pi/2$ electrical degrees the line voltage $U_{BC}$, and with rotation in the other direction it lags by the same angle.

If with reversal of magnetization of the core of saturation transformer 3 saturation conditions are attained, then with an active load across its winding 5 the energy transferred to the secondary circuit of transformer 3 is distributed non-uniformly over the period quarters of voltage $U_A$.

In this case the average value of the voltage induced in secondary winding 5 of transformer 3 is proportional to the frequency. With appropriate saturation angles of transformer 3 it is possible to obtain conditions when the major portion of the energy is transferred to the transformer output during the first and third quarters of the period of voltage $U_A$.

FIG. 2 shows a voltage-against-time graph of the device for clockwise rotation of the tachogenerator rotor, when the sequence of the tachogenerator voltage phases is ABC, and with active resistors 2 and 11. From the graph it can be seen that voltage $U$ across winding 5, which is rectified by phase-sensitive rectifier 6, is in phase with voltage $U_{BC}$ which controls this phase-sensitive rectifier.

The above device is thus a frequency sensitive device which is due to the use of a saturable core transformer. Remagnetizing the core of the transformer with the frequency of tachogenerator E.M.F. (from $+B_s$ to $-B_s$ and vice versa) produces impluses of voltage the number of which is proportional to the rotation rate of the tachogenerator rotor. The area of each impulse is constant. These impulses are of alternating polarity and uniform energy content. The number of impulses is proportional to the frequency. This property of the saturable transformer is described in various literature and is used in frequency meters and tachometers (see, for example, U.S. Pats. 2,908,864; 2,958,038; 2,962,658; and 3,103,628; and A. H. Wolferz "Tachometers of the Measurement of High Speeds," Jet Propels, September 1955, part 2).

From the voltage-against-time graph shown in FIG. 3 for a tachogenerator rotor rotating counterclockwise, it can be seen that voltage U rectified by rectifier 6 is in antiphase with voltage $U_{BC}$ which controls this phase-sensitive rectifier.

As a result the direction of the current flowing through load 10 will depend on the direction of rotation of the monitored shaft.

The value of the current is determined for a constant load across winding 5 by the average voltage induced in it, which is proportional to the rotation frequency of the rotor.

To limit the level of the signal applied for controlling rectifier 6 it is possible to use limiters of any known design. For controlling the full-wave phase-sensitive rectifier in the circuit according to FIG. 1, it is possible to incorporate at three-winding intervening transformer of the line voltage $U_{BC}$.

In the device shown in FIG. 4, to the series-connected with the centre-tap phases $B_1$, $B_2$ of a six-phase tachogenerator 12, via the working electrodes of the control diodes-thyristors 13, 14, 15, 16 there are connected respectively the primary windings 17, 18, 19, 20 of identical staturation transformers 21, 22.

Unidirectional voltage pulses rectified by rectifiers 23, 24 are applied to the control electrodes of thyristors from other phases of the tachogenerator.

Voltage of secondary windings 25, 26 of transformers 21, 22 is applied to an output load 31, via differential rectifiers 27, 28 and resistors 29, 30.

The saturation transformers 21, 22 are provided with field windings 32, 33 which pass the rectified current of the primary circuit of the other transformer.

If the anode of thyristor 13 is connected to the beginning of the winding formed by phases $B_1$ and $B_2$ of tachogenerator 12 connected together, the anode of thyristor 14 is connected to the end of this winding.

As a result, the conducting period of thyristor 13 is shifted by half a period towards the similar state of thyristor 14. Thyristors 15, 16 are connected in a similar way. The rotor of tachogenerator 12 is actuated by the monitored shaft.

If with rotation in one direction thyristors 13, 14 are controlled by voltages of the leading phases of tachogenerator 12, thyristors 15, 16 in this case are controlled by voltages of the lagging phases.

If the control voltage $U_c$ (FIG. 5) leads by $\frac{2}{3}\pi$ the voltage $U_{AK}$ which is applied to the working electrodes of the thyristor, the conducting period of the thyristor will last for the whole half-period, for example, for thyristor 13 throughout the interval from 0 to $\pi$, and for thyristor 14, correspondingly, throughout the interval from $\pi$ to $2\pi$.

Similarly, if the control voltage $U_C$ (FIG. 6) lags by $\frac{2}{3}\pi$ behind the voltage $U_{AK}$ at the working electrodes of the thyristor, the conducting period of the thyristor will last no longer than $\frac{1}{3}$ of a period. For example, for thyristor 15 throughout the interval $\frac{2}{3}\pi-\pi$, and for thyristor 16, correspondingly, throughout the interval $\frac{5}{3}\pi-2\pi$.

During the conducting period of the thyristors, primary windings 17, 18, or 19, 20 (FIG. 4) of transformers 21 or 22, respectively are connected via the open thyristor to phases $B_1$, $B_2$ of tachogenerator 12. In this case transformer 21 (22), the thyristors in whose circuit are controlled by the voltage of the leading phase, is affected by the phase $B_1$ and $B_2$ during a full period, the average value of which is proportional to the rotation frequency of the rotor of the tachogenerator 12. Simultaneously, the other transformer 22 (21) is affected by phases $B_1$ and $B_2$ during $\frac{1}{3}$ of a period and an interference signal appears across its windings 26 (25).

The rectified working current of the primary circuit of transformers 21, 22 flows through field windings 32, 33 in such a way that each of the transformers 21, 22 is mangetized by the rectified working current of the primary circuit of the other transformer.

As a result, transformer 22 (21), which has thyristors in its circuit open during part of the period, is polarized unilaterally and passes over to blocked magnetic switch conditions during which reversal of magnetization of the core ceases. In this case interference voltage decreases to a very insignificant value. As a result, the average voltage across an output load 31, rectified by rectifiers 27 (28), is determined exclusively by the voltage induced in winding 25 (26) of transformer 21 (22), connected to phases $B_1$, $B_2$ during the whole period.

With a change in the direction of rotation there is a change in the sequence of the phases of the voltages in windings $A_1$, $A_2$, $B_1$, $B_2$, $C_1$, $C_2$ of tachogenerator 12 and all the phenomena described above for thyristors 13, 14 and transformer 21 occur in thyristors 15, 16 and transformer 22 and vice versa.

In this case there is a reversal of the polarity of the signal at the output of the device. In some design versions of the device field windings 32, 33 may be omitted, in which case the centre-taps of windings 17, 18 of transformer 21 and windings 19, 20 of transformer 22 are connected to the centre-tap of the interconnected windings of phases $B_1$, $B_2$.

In case the six-phase tachogenerator 12 is replaced by a three-phase tachogenerator, an intervening transformer with one primary and two secondary windings can be included in the circuit of each phase. Now the secondary windings of these transformers are connected in the circuit in exactly the same way as the windings of phases $A_1$ and $A_2$, $B_1$ and $B_2$, $C_1$ and $C_2$ of tachogenerator 12 in the previous case.

To limit the level of the signal applied to the control electrodes of the thyristors it is possible to include level limiters of any known design.

Connected to three-phase tachogenerator 34 of the device shown in FIG. 7 are three-winding saturation transformers 35 and 36, with primary windings 37, 38, 39, 40 and secondary windings 41 and 42. Windings 38 and 39 are excitation windings and are connected directly to one phase of tachogenerator 34 (phase B) via resistors 43, 44.

Windings 37, 40 are field windings and are connected to the same phase of tachogenerator 34 via thyristors 45, 46 and resistors 47, 48.

Excitation windings 38, 39 and the corresponding field windings 37, 40 are connected in antiphase. Resistors 43, 44, 47, 48 may be ohmic or reactive or omitted altogether. The operation of each of the thyristors 45, 46 is controlled by unidirectional voltage of the two other phases A, C of tachogenerator 34, rectified by rectifiers 49, 50. Limitation of the control signal level is provided by a limiter consisting of resistors 51, 52, 53, 54 and stabilotrons 55, 56.

The ampere-turns produced by field windings 37, 40 with thyristors 45 or 46 fully open exceed the ampere-turns of the corresponding excitation windings 38, 39.

Via a differential rectifier formed by rectifiers 57, 58 and resistors 59, 60, voltage of secondary windings 41, 42 of transformers 35, 36 is applied to an output load 61.

With the rotor of tachogenerator 34 turning clockwise, for example, the sequence of phase voltages is ABC and thyristor 45 is controlled by the signal of the leading phase as a result of which it is open during half a period. During the conducting period of the thyristor the ampere-turns produced by winding 37 exceed those produced by winding 38, due to which transformer 35 is polarized unilaterally and passes over to blocked magnetic switch conditions. In this case the voltage across winding 41 drops to a very low value.

Thyristor 46 is controlled by the signal of the lagging phase C and is open during ⅓ of the half-period.

If saturation angle $\beta$ of transformers 35, 36 is less than $\tfrac{2}{3}\pi$ voltage is induced in secondary winding 42 of transformer 36, the average value of which is proportional to the frequency. The magnitude and polarity of the signal across output load 61 is determined from rectifier 58 by the voltage of winding 42 of transformer 36.

With a change in the direction of rotation of the rotor of tachogenerator 34, there is a change in the sequence of phases, and all the phenomena described above for thyristor 45, transformer 35 and rectifier 58 occur, respectively, in thyristor 46, transformer 36, rectifier 57 and vice versa.

Rectifiers 57, 58 can be either half-wave or full-wave.

What we claim is:

1. A frequency sensitive device for determining the value and direction of the angular speed of rotation of a machine part comprising a polyphase A.C. generator comprising at least one saturable core transformed having at least one input and one output winding and being connected to receive the output voltage of one phase of said A.C. generator, the amplitude of said voltage being greater than necessary for saturation of the core of said transformer such that impulses of the alternative polarity with uniform content of energy are distributed unevenly in odd and even quarters of the period of the said voltage of the generator, whereby the average voltage on the output winding of said transformer is proportional to the frequency, at least one phase sensitive rectifier means for producing rectified current and for changing the value or direction of the rectified current dependent on the phase angle between the output voltages of said generator, controlling circuit means for each phase sensitive unit D.C., and a load for each phase sensitive means.

2. A frequency sensitve device comprising a two-phase generator rotatable in either direction, a first voltage output therefrom lagging a second voltage output therefrom by 90 degrees for generator rotation in one direction and leading by 90 degrees for opposite generator rotation, a reactance, a saturable core transformer having input and output windings, the input winding of said transformer being connected in series with said reactance, said reactance being connected to the said first voltage output; a phase-sensitive rectifier having at least one input, one output and one controlling terminal, an integrating resistance, the input terminal of the phase sensitive rectifier being in series with said integrating resistance which is connected to the transformer output winding on which a major portion of energy is transferred during the first and third quarters of the period of the first output voltage of the said generator, an indicating instrument constituting a load, the output terminal of the phase sensitive rectifier being connected to said indicating instrument, the controlling terminal of the said phase sensitive rectifier being connected in series with the reactance to the said second voltage of the generator whereby in one direction in which the generator is rotated the potential on the output terminal will be in phase with the potential on the controlling terminal and the current will flow via the load in one direction, and in the opposite direction of rotation of the generator the potential on the said input and controlling terminals of the phase sensitive rectifier will be substantially in opposite phase and the said current will flow via the load in opposite direction.

3. A device as claimed in claim 2 in which there are a pair of said controlling terminals connected in series with the reactance to an output winding of the transformer, the input winding being connected to the said second voltage of the generator.

4. A frequency-sensitive device for determining the value and direction of the angular speed of rotation of a machine part comprising an A.C. generator with six windings which include terminals and are grouped in pairs thus forming a two-winding three-phase generator having six output lines, two windings of the first phase of the said three phase generator being connected in common at their inner ends as a center tap to the outer ends of these windings, similar terminals being connected, four silicon controlled rectifiers including anodes and cathodes, two anodes being connected to each terminal to form terminals of two identical phase sensitive units, two silicon controlled rectifiers of each unit being connected to both outer terminal ends of the said generator windings, the cathodes of the said rectifiers of each phase sensitive unit being connected to both outer terminals of first and second of the input windings, two identical saturable core transformers including three input and one output windings, the inner terminals of said first and second input windings of the saturable core transformers being connected in common at their inner ends in the manner of center tap while the third input winding of the first saturable transformer is connected by one terminal to the said center tap of the input windings of the second saturable transformer, the second terminal of the third winding being connected to the said center tap of the windings of the first phase of the generator, unidirectional current flowing via the third winding of the first saturable core transformer and passing via the first and second input windings of the said second saturable transformer; three input windings of the second saturable transformer being connected with the second phase sensitive unit, with the first saturable transformer and said center tap of the first phase of the generator for triggering the silicon controlled rectifiers to conductive condition for controlling the gates of one silicon controlled rectifier of the said first phase sensitive unit in series with the rectifier and being connected to the beginning of the first output winding of the second phase of said generator and the gate of the second silicon controlled rectifier in series with rectifier being connected to the end of the second winding of the same phase, the second terminals of each windings of the said second phase of the generator being connected with said cathodes, corresponding silicon controlled rectifiers forming triggering circuits of the first phase sensitive unit, triggering circuits of the second phase sensitive unit being formed employing output windings of the said third phase of the generator, gates of the two other silicon controlled rectifiers and two rectifiers; a potential being developed in one of the said transformer output winding when the said generator is rotated in one direction and a potential being developed in the other of said output transformer windings when the said generator is rotated in the opposite direction, the magnitude of the said output potentials being directly related to the rate of rotation of the said generator.

5. The device as in claim 4 in which the said controlling circuits comprise resistances and Zener diodes for limiting circuits and potentials.

6. The device as in claim 4 comprising a one-winding three-phase generator and three transformers including input windings each being connected with each output winding of the generator and the triggering circuits of the phase sensitive unit being connected to the secondary windings of two transformers.

7. A frequency device for determining the value and direction of the angular speed of rotation of a machine part comprising three phase A.C. generator, two identical saturable core transformers with two input and one output windings, the beginning of the first input winding of each of the said transformers together with the resistance in series being connected to the beginning of the first phase of the said generator, and the ends of the said first input windings of each transformer being connected with the end of the said phase, the beginning of the second input winding of each of the said transformer being connected to the end of the said phase generators and the end of each of the said second input windings being connected with a cathode of the silicon controlled rectifier, the anodes of each of the said rectifiers together with a resistance in series being connected with the beginning of the said first phase; on triggering of each of the said silicon rectifiers into conductive condition, the magnetized force (M.M.F.) created by the current in the second input winding of each of the said saturable transformers being greater than the magnetized force (M.M.F.) created by the current in their first input winding and opposite to it, the triggering circuit of each of silicon controlling rectifiers being connected to its gate and cathode and comprising rectifier for creating unidirectional current and a resistance Zener diode for limiting current and potentials connected to the second and third phases of the said generator.

8. A device as in claim 7 in which both input windings and both saturable transformers are connected each separately to the two different phases of said three-phase generator and triggering circuits of both silicon controlled rectifiers are connected to the third phase of the generator.

References Cited

UNITED STATES PATENTS 3,329,883   7/1967   Frierdich _____ 321—5

FOREIGN PATENTS 1,294,743   2/1961   France _____ 324—165

J D MILLER, Primary Examiner

W. J. SMITH, Assistant Examiner

U.S. Cl. X.R.

324—70